(12) United States Patent
Joo

(10) Patent No.: US 12,715,401 B2
(45) Date of Patent: Aug. 25, 2026

(54) APPARATUS AND METHOD FOR CONTROLLING ELECTRO-MECHANICAL BRAKE SYSTEM, AND ITS SYSTEM

(71) Applicant: HL MANDO CORPORATION, Pyeongtaek-si (KR)

(72) Inventor: Kyoungjin Joo, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 165 days.

(21) Appl. No.: 18/382,374

(22) Filed: Oct. 20, 2023

(65) Prior Publication Data

US 2024/0400012 A1 Dec. 5, 2024

(30) Foreign Application Priority Data

May 31, 2023 (KR) ........................ 10-2023-0069696

(51) Int. Cl.
*B60T 8/172* (2006.01)
*B60T 8/171* (2006.01)
*B60T 11/16* (2006.01)

(52) U.S. Cl.
CPC .............. *B60T 8/172* (2013.01); *B60T 8/171* (2013.01); *B60T 11/16* (2013.01)

(58) Field of Classification Search
CPC .......... B60T 8/172; B60T 8/171; B60T 11/16; B60T 7/042; B60T 13/662; B60T 13/745; B60T 13/66; B60T 17/221; B60R 16/033
(Continued)

(56) References Cited

U.S. PATENT DOCUMENTS 5,129,713 A * 7/1992 Matsuda ................... B60T 8/88 340/636.15
6,199,957 B1 * 3/2001 Soga ....................... B60T 7/042 303/3

(Continued)

FOREIGN PATENT DOCUMENTS

KR 10-2021907 B1 11/2019
KR 10-2022-0116310 A 8/2022
WO WO-9927640 A2 * 6/1999 ................ H02P 7/04

OTHER PUBLICATIONS

Office Action issued on Jan. 24, 2026, for corresponding Korean Patent Application No. 10-2023-0069696, withs its English translation, 15 pages.

*Primary Examiner* — Lindsay M Low
*Assistant Examiner* — Brian R Kirby
(74) *Attorney, Agent, or Firm* — Hauptman Ham, LLP

(57) ABSTRACT

The present disclosure relates to a control apparatus and method of an electro-mechanical brake system and its system. A device according to an embodiment of the present disclosure is a device for controlling an electro-mechanical brake system of a vehicle, and may include a memory; and a processor configured to control an operation of the system by controlling a motor operating based on power of a battery to provide a braking force to the vehicle using information stored in the memory, wherein the processor is configured to control a current applied to the motor to be adjusted based on a maximum allowable current, $I_L$ of the battery limited according to a voltage information, $V_B$ of the battery.

14 Claims, 8 Drawing Sheets

(58) Field of Classification Search
USPC ........................................................... 303/14
See application file for complete search history.

(56) References Cited

U.S. PATENT DOCUMENTS

| | | | | |
|---|---|---|---|---|
| 2002/0101114 | A1* | 8/2002 | Kamiya | B60T 8/4275 303/114.1 |
| 2003/0030322 | A1* | 2/2003 | Yokoyama | B60T 8/3255 303/122.04 |
| 2009/0026835 | A1* | 1/2009 | Matsubara | B60T 7/12 303/15 |
| 2009/0039702 | A1* | 2/2009 | Nishino | B60T 7/042 303/114.1 |
| 2011/0316329 | A1* | 12/2011 | Nishino | B60T 7/042 303/14 |
| 2012/0063922 | A1* | 3/2012 | Sano | F16H 61/682 417/44.1 |
| 2012/0078455 | A1* | 3/2012 | Chrostowski | B60W 30/188 903/930 |
| 2013/0289845 | A1* | 10/2013 | Ajiro | B60T 13/745 701/70 |
| 2014/0265542 | A1* | 9/2014 | Boswell | B60T 13/745 303/3 |
| 2015/0344014 | A1* | 12/2015 | Knechtges | B60T 13/745 303/3 |
| 2016/0094180 | A1* | 3/2016 | Ajima | B62D 5/065 318/504 |
| 2016/0329853 | A1* | 11/2016 | Koseki | H02P 29/68 |
| 2017/0326999 | A1* | 11/2017 | Tani | B60L 3/0046 |
| 2020/0108809 | A1* | 4/2020 | Mizutani | B60T 17/221 |
| 2020/0244203 | A1* | 7/2020 | Hara | H02P 3/04 |

* cited by examiner

APPARATUS AND METHOD FOR CONTROLLING ELECTRO-MECHANICAL BRAKE SYSTEM, AND ITS SYSTEM

FIELD

The present disclosure relates to a control technology of an electro-mechanical brake system in a vehicle, and more particularly, to a technology for performing motor control for power protection of battery in an electro-mechanical brake system of a vehicle.

BACKGROUND

A brake system for braking is essentially mounted on a vehicle. Recently, various types of electro-mechanical brake systems have been proposed to obtain stronger and more stable braking force. For example, electro-mechanical brake systems such as intelligent Integrated Dynamic Brake (IDB) systems have recently been proposed.

The IDB systems include a pressure generating device for outputting an operation of a brake pedal as an electrical signal through a pedal displacement sensor, operating a three-phase motor, and converting a rotational force of the three-phase motor into a linear motion to generate a braking hydraulic pressure, a valve block provided with a plurality of valves to receive a hydraulic pressure by a force generated by the pressure supply device and control a braking operation, and a controller for controlling the three-phase motor and the valves.

That is, the electro-mechanical brake systems such as the IDB systems are a system for generating boosting power and braking force using a single three-phase permanent magnet synchronous motor, and detect a braking intention of a driver transmitted through a brake pedal, and control operation of the motor to generate braking force.

On the other hand, in a conventional electro-mechanical brake system (hereinafter, referred to as "conventional technology"), a battery voltage is not stable or a battery function is deteriorated due to a lifespan. In this case, when a full torque is generated to implement the braking intention of the driver, a voltage of the battery is rapidly lowered, thereby affecting the performance of other systems in the vehicle using the corresponding battery and adversely affecting the safety of the vehicle operation. Hereinafter, an in-vehicle system using the battery is referred to as a "battery system". That is, when the voltage of the battery is lowered due to the full torque of the conventional technology, another battery system using the corresponding battery is down during operation of the vehicle, and thus a dangerous situation may occur.

However, the above description merely provides background information on the present disclosure and does not correspond to a previously disclosed technology.

SUMMARY

The present disclosure has been made in view of the above problems, and an object of the present disclosure is to provide a technology for performing motor control for power protection of a battery in an electro-mechanical brake system.

The present disclosure also provides a technology for preventing battery power from being lowered to a certain level by controlling a motor of the electro-mechanical brake system to limit a current of a battery usable for each voltage band.

The present disclosure also provides a technology for preventing battery voltage from being rapidly lowered by controlling a motor current of an electro-mechanical brake system used when battery power is insufficient to limit a current of a battery, and thus preventing another battery system in a vehicle using the corresponding battery from being down during vehicle operation.

However, the present disclosure is not limited to the above-mentioned problems, and other problems not mentioned will be clearly understood by those skilled in the art from the following description.

According to another aspect of the present disclosure, there is provided an apparatus for controlling an electro-mechanical brake system of a vehicle, the apparatus including: a memory; and a processor configured to control an operation of the system by controlling a motor operating based on power of a battery to provide a braking force to the vehicle using information stored in the memory, wherein the processor is configured to control a current applied to the motor to be adjusted based on a maximum allowable current, $I_L$ of the battery limited according to a voltage information, $V_B$ of the battery.

The processor may be configured to control the current applied to the motor to be reduced if the $V_B$ is included in an adjustment required section.

The adjustment required section may include a section in which the $V_B$ corresponds to a value smaller than a value of a maximum voltage state of the battery.

The adjustment required section may include a specific section in which the $I_L$ and the $V_B$ are mapped in a linear relationship or a correlation.

The specific section may be comprised between a point at which the $I_L$ has a maximum current value and a point at which the $I_L$ has a minimum current value.

The processor may be configured to control the current applied to the motor to be adjusted based on a current command $I_{ref}$* reflecting a current command $\Delta I_{ref}$ for adjusting a current command $I_{ref}$ for the motor in the $I_{ref}$.

The processor may be configured to estimate an estimated value, $I_B$* for a total current of the battery using a power value consumed by a inverter driving the motor using power of the battery, and derive the $\Delta I_{ref}$ based on the estimated value, $I_B$*.

The processor may be configured to compute a residual power $\Delta P$ depending on a current more used than the $I_L$ by multiplying $\Delta I$ corresponding to a difference between the $I_B$* and the $I_L$ by the $V_B$, and derive the $\Delta I_{ref}$ by assuming that the computed $\Delta P$ is driven in the motor.

The processor may be configured to derive the $\Delta I_{ref}$ by dividing a rotational speed of the motor and a motor torque constant in the $\Delta P$, respectively.

The processor may convert the $I_{ref}$* into current commands, $I_d$* and $I_q$* in a coaxial coordinate system, derive voltage commands, $V_d$ and $V_q$ for adjusting the operation of the motor depending on the converted $I_d$* and $I_q$*, and convert the derived $V_d$ and $V_q$ into a three-phase voltage command of the motor.

According to another aspect of the present disclosure, there may be provided an electro-mechanical brake system of a vehicle, the electro-mechanical brake system including: a master cylinder being connected to the brake pedal; a hydraulic pressure supply device comprising a motor generating a rotational force and a hydraulic pressure piston movably accommodated in a pressure chamber, and generating hydraulic pressure by movement of the hydraulic pressure piston; a hydraulic pressure control unit controlling a flow of the hydraulic pressure transmitted from the hydraulic pressure supply device to a wheel cylinder; a hydraulic pressure block having the master cylinder, the hydraulic pressure supply device, and the hydraulic pressure control unit integrated therein; and a controller for controlling the motor and the hydraulic pressure control unit, and controlling the motor operating based on power of a battery to provide a braking force to the vehicle, wherein the controller is configured to control a current applied to the motor to be adjusted based on a maximum allowable current, $I_L$ of the battery limited according to a voltage information, $V_B$ of the battery.

The control method according to an embodiment of the present disclosure may be a control method performed in an electro-mechanical brake system of a vehicle and controlling a motor operating based on power of battery to provide a braking force to the vehicle, the method including: determining whether $V_B$, which is voltage information of the battery, corresponds to an adjustment required section; and controlling a current applied to the motor to be adjusted based on a maximum allowable current, $I_L$ of the battery limited according to the $V_B$ if the $V_B$ corresponds to the adjustment required section.

The controlling may include controlling the current applied to the motor to be reduced if the $V_B$ corresponds to the adjustment required section.

The controlling may include controlling the current applied to the motor to be adjusted based on a current command $I_{ref}$* reflecting a current command $\Delta I_{ref}$ for adjusting a current command $I_{ref}$ for the motor in the $I_{ref}$.

The controlling may include estimating an estimated value, $I_B$* for a total current of the battery using a power value consumed by a inverter driving the motor using power of the battery, and derive the $\Delta I_{ref}$ based on the estimated value, $I_B$*.

The controlling may include computing a residual power $\Delta P$ depending on a current more used than the $I_L$ by multiplying $\Delta I$ corresponding to a difference between the $I_B$* and the $I_L$ by the $V_B$; and deriving the $\Delta I_{ref}$ by assuming that the computed $\Delta P$ is driven in the motor.

The controlling include deriving the $\Delta I_{ref}$ by dividing a rotational speed of the motor and a motor torque constant in the $\Delta P$, respectively.

The controlling may include converting the $I_{ref}$* into current commands, $I_d$* and $I_q$* in a coaxial coordinate system, deriving voltage commands, $V_d$ and $V_q$ for adjusting the operation of the motor depending on the converted $I_d$* and $I_q$*; and converting the derived $V_d$ and $V_q$ into a three-phase voltage command of the motor.

The electro-mechanical brake system according to the present disclosure configured as described above has an advantage of protecting battery power during motor control and limiting battery current within a stable range.

In addition, the electro-mechanical brake system according to the present disclosure has an advantage of preventing the voltage of the battery from falling below a predetermined level by limiting the current of the battery usable for each band when the motor is controlled.

In addition, the electro-mechanical brake system according to the present disclosure has an advantage of maintaining the power of the battery at a predetermined level even in a situation where the voltage of the battery is unstable when the motor is controlled, and thus may prevent another battery system in a vehicle using the battery from being down during a vehicle operation due to a rapidly degraded battery voltage, thereby enabling a function stabilization of the other battery system.

In addition, the electro-mechanical brake system according to the present disclosure has an advantage of limiting the battery current under limited battery conditions while being able to control a braking force of a certain level or more to be provided to the vehicle.

In addition, the present disclosure has an advantage of being able to prevent overheating of the battery B while improving the efficiency of the system due to the additional battery current ripple reduction effect.

The effects obtained by the present disclosure are not limited to the above-described effects, and other effects which are not described herein will be clearly understood by those skilled in the art from the following description.

DETAILED DESCRIPTION

Figure 1:
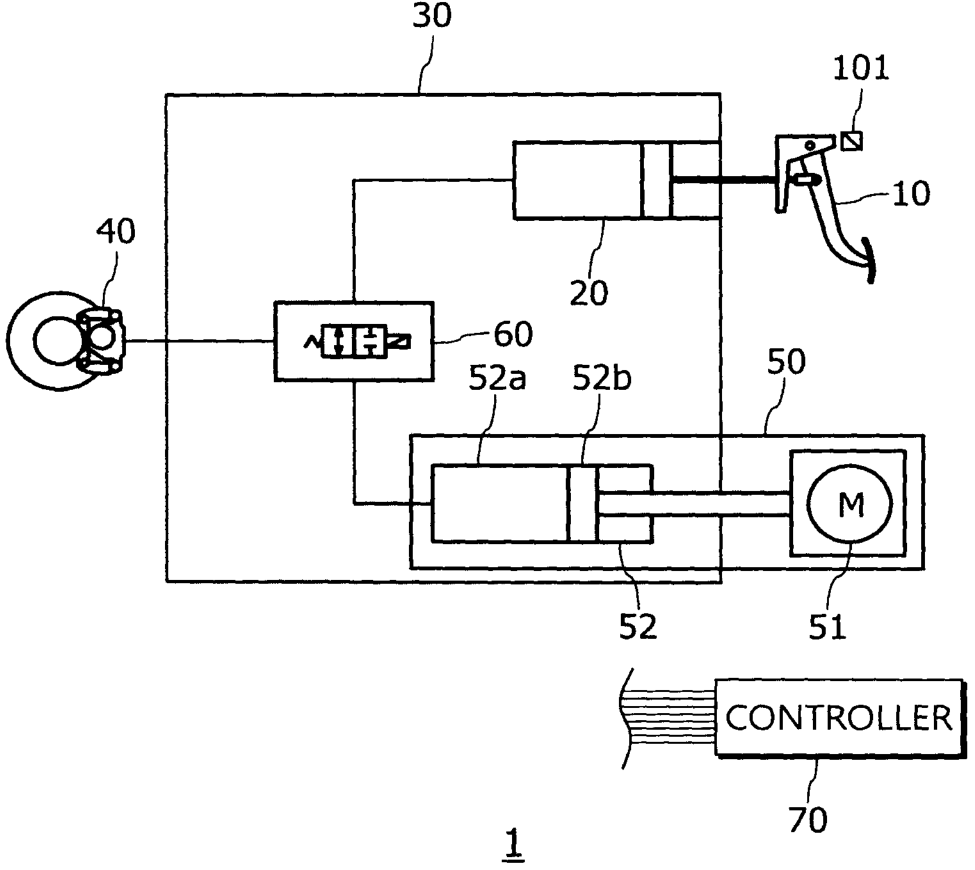
FIG. 1 shows a schematic configuration of an electro-mechanical brake system 1 according to an embodiment of the present disclosure.

The above objects, means and advantages of the present disclosure will become apparent from the following detailed description of the accompanying drawings, and accordingly, those skilled in the art will easily embody the technical idea of the present disclosure. In addition, in the description of the present disclosure, a detailed description of known techniques related to the present disclosure will be omitted when it is determined that the subject matter of the present disclosure may be unnecessarily obscured.

The terminology used herein is for the purpose of describing embodiments and is not intended to limit the present disclosure. In the present specification, the singular forms “a”, “an” and “the” are intended to include the plural forms as well, unless otherwise specified. In the present specification, the terms “comprise”, “include”, “provided with”, and “have” do not exclude the presence or addition of one or more other components other than the mentioned components.

In the present specification, the terms “or”, “at least one”, and the like may indicate one of the words listed together, or may indicate a combination of two or more. For example, “A or B”, “at least one of A and B” may include only one of A or B, and may include both A and B.

In the description according to “for example”, and the like, the presented information such as the characteristics, variables, or values mentioned may not be exactly consistent, and the embodiments of the present disclosure according to various embodiments of the present disclosure should not be limited by effects such as variations including tolerances, measurement errors, limitations of measurement accuracy, and other commonly known factors.

In the present specification, when an element is described as being "connected to" or "coupled with" another element, it should be understood that the element may be directly connected to or connected to the other element, but other elements may be present in the middle. On the other hand, when an element is described as being "directly connected to" or "directly coupled with" another element, it should be understood that there are no intervening elements.

In the present specification, when an element is described as being "over" or "on top of" another element, it should be understood that the element may be directly engaged or connected to the other element, but other elements may be present in the middle. On the other hand, when an element is described as being "directly on" or "in contact with" another element, it should be understood that there are no intervening elements. Other expressions for describing a relationship between elements, for example, "between" and "directly between" may be interpreted as well.

In the present specification, the terms "first", "second", and the like may be used to describe various elements, but the elements should not be limited by the above terms. In addition, the above terms should not be interpreted as being used to limit the order of each element, but may be used to distinguish one element from another. For example, the first component may be referred to as the second component, and similarly, the second component may be referred to as the first component.

Unless otherwise defined, all terms used in the specification may be used in their meanings that can be commonly understood by those skilled in the art to which the present disclosure pertains. Further, terms defined in a commonly used dictionary are not interpreted ideally or excessively unless otherwise clearly defined.

Hereinafter, a preferred embodiment of the present disclosure will be described in detail with reference to the accompanying drawings.

Figure 2:
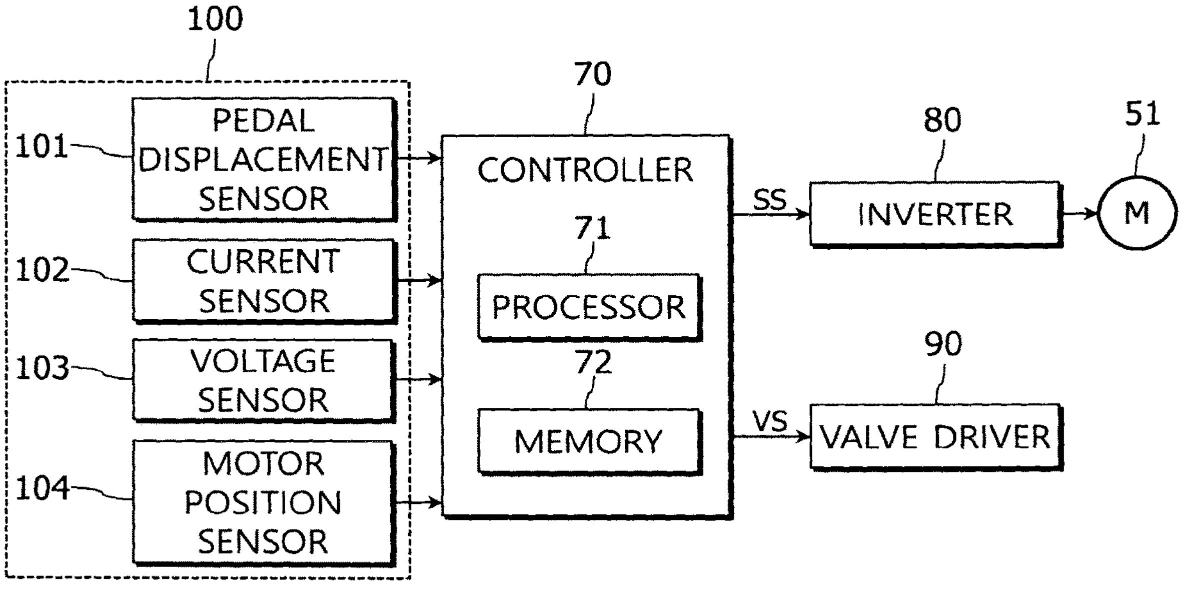
FIG. 2 shows a schematic block diagram related to a control operation of the electro-mechanical brake system 1 according to an embodiment of the present disclosure.

FIG. 1 shows a schematic configuration of an electro-mechanical brake system 1 according to an embodiment of the present disclosure. FIG. 2 shows a schematic block diagram related to a control operation of the electro-mechanical brake system 1 according to an embodiment of the present disclosure, and FIG. 3 shows a more detailed view of a configuration of an inverter 80 in FIG. 2.

The electro-mechanical brake system 1 (hereinafter, referred to as "the system") according to an embodiment of the present disclosure is a brake system applied to a vehicle. The system 1 detects the driver's intention to brake according to manipulation of the brake pedal 10, and controls driving of a motor M, 51 based on a power of the battery B according to the recognized braking intention to provide braking force to the vehicle. For example, the system 1 may be an integrated dynamic brake (IDB) system, but is not limited thereto.

Figure 3:
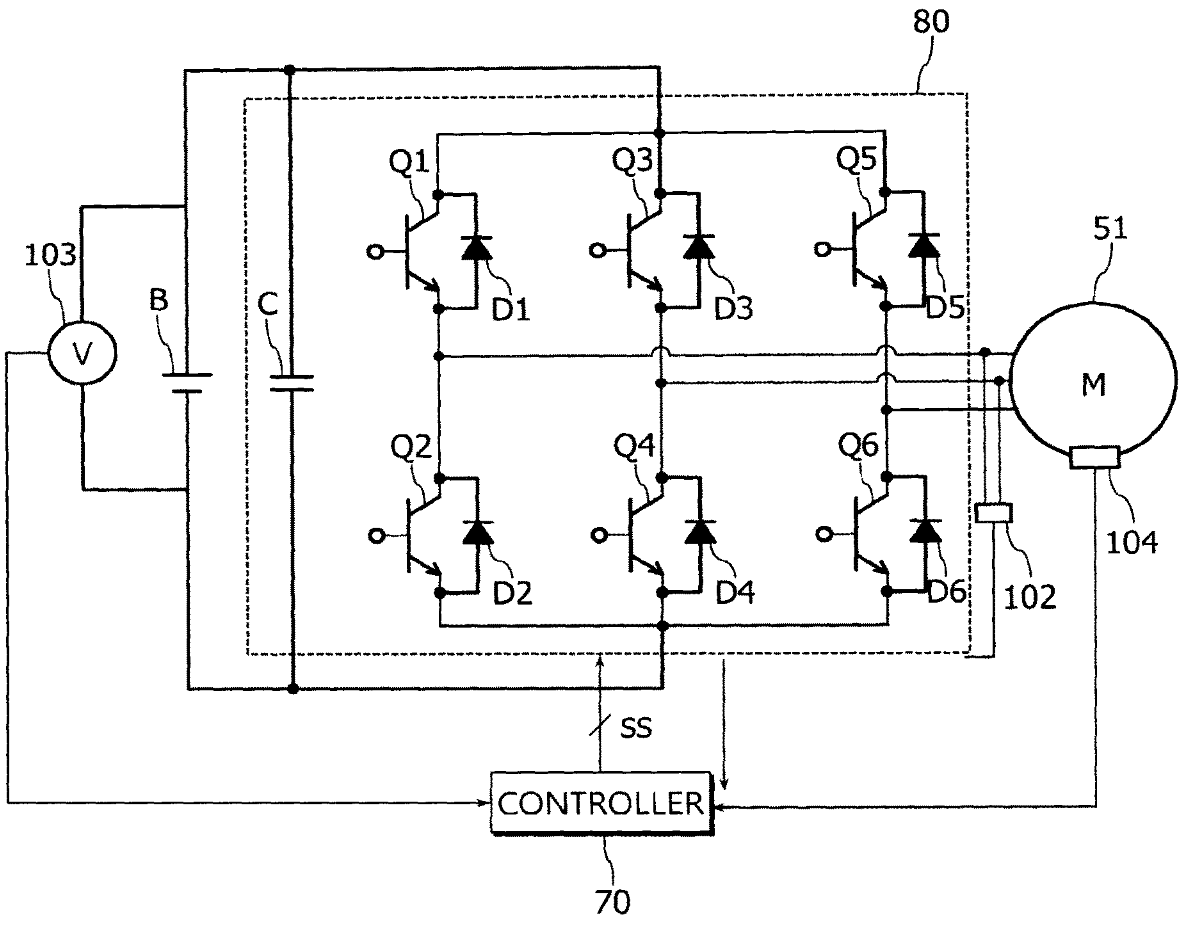
FIG. 3 shows a more detailed view of a configuration of an inverter 80 in FIG. 2.

Referring to FIGS. 1 to 3, the system 1 may include a brake pedal 10, a master cylinder 20, a hydraulic pressure block 30, a wheel brake 40, a hydraulic pressure supply device 50, a hydraulic pressure control unit 60, a controller 70, an inverter 80, a valve driver 90, and a sensor 100.

In this case, the master cylinder 20 is provided in the hydraulic pressure block 30 and pressurizes and discharges a pressurizing medium accommodated therein by operating the brake pedal 10. For example, the master cylinder 20 may be configured to generate hydraulic pressure by including a master piston connected to the brake pedal 10 and pressurized according to a pedal effort of the brake pedal 10 and a master chamber. The master cylinder 20 may include a clabis 21 coupled to the brake pedal 10, an input shaft 22 coupled to the clabis 21.

The hydraulic pressure block 30 has a plurality of flow paths and valves for adjusting the hydraulic pressure therein. The hydraulic pressure block 30 may serve to transfer the hydraulic pressure to the wheel brake 40 provided in each wheel. For example, the hydraulic pressure block 30 may have a flow path formed therein and a plurality of valves may be installed in appropriate positions to control the hydraulic pressure transferred to the wheel brake 40. In addition, the master cylinder 20 may be provided in the hydraulic pressure block 30. In this case, a reservoir for storing oil may be coupled to an upper portion of the hydraulic pressure block 30 having the master cylinder 20 to provide the hydraulic pressure to the master cylinder 20.

The wheel brake 40 provides braking force to the wheels according to the supplied hydraulic pressure. The wheel brake 40 may be coupled to the hydraulic pressure block 30 and provided in each wheel.

The hydraulic pressure supply device 50 is coupled to the hydraulic pressure block 30, generates hydraulic pressure by driving the hydraulic pressure by an electrical signal corresponding to a displacement of the brake pedal 10, and supplies the generated hydraulic pressure to each wheel brake 40 provided in each wheel. In this case, the hydraulic pressure supply device 50 may include a motor 51 coupled to one side of the hydraulic pressure block 30, and a slave cylinder 52 coupled to the corresponding motor 51 and pressurized by a power converter for converting rotational force into linear motion.

The motor 51 is a device for generating a rotational force using electricity, and may be a three-phase motor. For example, the motor 51 may be a permanent magnet synchronous motor (PMSM) or the like. The motor 51 may have a stator and a rotor.

The power converter may be provided with a plurality of gears that receive a rotational force from a rotation shaft of the motor 51 and convert rotational motion into linear motion. For example, the power converter may have an assembly structure of a worm, a worm wheel, and a rack and pinion gear to convert rotational force into linear motion.

The slave cylinder 52 may include a slave piston 52A which is installed in the hydraulic pressure block 30 separately from the master cylinder 20 and generates hydraulic pressure while reciprocating by the rotational force of the motor 51, and a hydraulic pressure chamber 52B which is pressurized by the slave piston 52A. At this time, the rack gear may be formed on a portion of the slave piston 52A so that the slave piston 52A linearly moves through the power converter.

The hydraulic pressure control unit 60 controls the flow of hydraulic pressure transmitted to each wheel brake 40 by the master cylinder 20 or the hydraulic pressure supply device 50. That is, the hydraulic pressure control unit 60 may receive the hydraulic pressure from the master cylinder 20 or the hydraulic pressure supply device 50 and control the hydraulic pressure transmitted to the wheel brake 40. For example, the hydraulic pressure control unit 60 may include a solenoid valve that is electronically opened and closed.

In addition to the above-described configurations, the hydraulic pressure block 30, the hydraulic pressure supply device 50, and the hydraulic pressure control unit 60 may be implemented as various types and structures of devices.

The controller 70 controls the operation of the system 1. That is, based on sensor information (e.g., pedal displacement information, current information, voltage information, motor position information, hydraulic pressure information, etc.) detected by the various sensors 100, the operation of each component of the system 1 (e.g., the hydraulic pressure supply device 50, the hydraulic pressure control unit 60, the inverter 80, the valve driver 90, etc.) can be controlled. In particular, the controller 70 may control the operation of the inverter 80 to control driving of the motor 51.

The controller 70 may be differently referred to as a "control device" or an "electronic control unit (ECU)", and may include a processor 71 and a memory 72, as shown in FIG. 2. At this time, the processor 71 may control the operation of the system 1 using information stored in the memory 72. The memory 72 may store programs for processing or controlling the processor 71, various data for operating the system 1, and the like.

For example, the memory 72 may include a volatile memory such as a SRAM or a DRAM, and may include a non-volatile memory such as a flash memory, a read only memory (ROM), an erasable programmable read only memory (EPROM).

The controller 70 may generate the hydraulic pressure by controlling the operation of the hydraulic pressure supply device 50. For example, the controller 70 may generate a hydraulic pressure in the hydraulic pressure chamber 52B by moving the slave piston 52A by the operation of the motor 51 of the hydraulic pressure supply device 50. The hydraulic pressure generated by the hydraulic pressure supply device 50 may be supplied to the wheel brake 40 through the hydraulic pressure control unit 60 to generate braking force on the wheel. In this case, the controller 70 may increase, decrease or maintain the pressure of the wheel brake 40 of the wheel by driving the hydraulic pressure supply device 50 and the hydraulic pressure control unit 60 according to the required target pressure.

Each sensor 100 may be electrically connected to an input side of the controller 70 to receive sensor information (signal) detected by each sensor 100. In this case, the sensor 100 may include a pedal displacement sensor 101, a current sensor 102, a voltage sensor 103, and a motor position sensor 104.

The pedal displacement sensor 101 is a sensor for detecting a current state of the brake pedal 10, and may detect an operation and displacement of the brake pedal 10 operated by the driver. That is, the driver presses performs a pressing operation on the brake pedal 10 when braking force is required during operation of the vehicle. At this time, a displacement of the brake pedal 10 according to the pressing operation is detected by the pedal displacement sensor 101, and pedal displacement information detected by the pedal displacement sensor 101 is transmitted to the controller 70.

The current sensor 102 is a sensor for detecting a current flowing in three phases of the motor 51 and may detect a current flowing in at least two phases among the three phases. This is because current information on the other one phase can be calculated only with current information on two phases. Accordingly, the current sensor 102 may include a first current sensor for detecting a current flowing in any one of three phases of the motor 51 and a second current sensor for detecting a current flowing in any one of the remaining two phases. As described above, the current information detected by the current sensor 102 is transmitted to the controller 70.

The voltage sensor 103 is a sensor for detecting a current state of the battery B, and may detect a voltage of the battery B. That is, the system 1 performs a power protection control operation according to a voltage state of the battery 1. To this end, the voltage sensor 103 detects the voltage state of the battery 1. In this way, the voltage information detected by the voltage sensor 103 is transmitted to the controller 70.

The motor position sensor 104 is a sensor for detecting a rotation-related state of the motor 51, and may detect a rotation position and a rotation speed of the motor 51. For example, the motor position sensor 104 may include at least one hall sensor for detecting the position of the rotor. The hall sensor acts to sense based on a current magnetic effect called a Hall effect. In this case, the "Hall effect" refers to a case in which electromotive force (Hall voltage) is generated at both ends of a compound semiconductor when a current flows through the compound semiconductor and a magnetic field is applied at a right angle. When the hall voltage is measured using the Hall effect, it may be determined whether the applied magnetic field is an N pole or an S pole. The hall sensor may detect the position or speed of the rotor by detecting a change in the pole of a permanent magnet provided in the rotor using this principle. As described above, the position information or speed information of the motor 51 detected by the motor position sensor 104 is transmitted to the controller 70.

Of course, various sensors 100 may be provided in addition to the above-described sensors 101, 102, 103, and 104, and corresponding sensor information may be transmitted to the controller 70. For example, the sensor 100 may further include a pressure sensor (not shown). In this case, the pressure sensor may detect the pressure of the wheel brake 40 and detect the hydraulic pressure transmitted to the wheel brake 40. The pressure information and the hydraulic pressure information related to the wheel brake 40 detected by the pressure sensor may be transmitted to the controller 70.

The inverter 80 and the valve driver 90 may be electrically connected to the output side of the controller 70. That is, the controller 70 may control the operations of the inverter 80 and the valve driver 90 connected to the output side using various sensor information transmitted from the sensor 100 connected to the input side. In this case, the inverter 80 may drive the motor 51 according to a switching control signal SS transmitted from the controller 70, and the valve driver 90 may drive various electronic valves provided in the system 1 according to a valve control signal VS transmitted from the controller 70. For example, the valve driver 90 may drive a solenoid valve or the like of the hydraulic pressure control unit 60.

The memory 72 may store sensor information received after being detected from each sensor 100. In this case, the processor 71 may control the operation of the motor 51 by transmitting the switching control signal SS to control the operation of the inverter 80 based on the sensor information stored in the memory 72, and may control the operation of the valve driver 90 by transmitting the valve control signal VS to control the operation of the hydraulic pressure control unit 60.

The processor 71 may generate a hydraulic pressure by movement of the slave piston 52A by controlling driving of the motor 51 and the hydraulic pressure control unit 60 and may break the wheel by supplying the generated hydraulic pressure to the wheel brake 40 provided in the wheel. At this time, the processor 71 may determine target pressure (i.e., command pressure) according to the displacement of the brake pedal 10 detected through the pedal displacement sensor 101.

In addition, the processor 71 may identify motor position, speed, acceleration, and the like of the motor 51 using the sensor information transmitted from the motor position sensor 104.

For example, the processor 71 may determine the amount of movement of the slave piston 52A from a change in the motor position of the motor 51. That is, the processor 71 may determine the amount of movement by the slave piston 52A moving from origin position to current position from the change in the motor position.

The processor 71 may determine the pressure by converting the amount of movement of the slave piston 52A into a pressure value. As the slave piston 52A moves forward, the volume of the hydraulic chamber 52B decreases, and the pressure may increase. The processor 71 may convert the pressure from the amount of movement of the slave piston 52A in the same volume. Of course, the opposite is also possible. In addition, the processor 71 may determine the pressure of the wheel brake 40 identified through the pressure sensor as a circuit pressure.

The processor 71 may detect a pedal displacement of the brake pedal 10 through the pedal displacement sensor 101, determine a target pressure based on the detected pedal displacement, set the determined target pressure as a target pressure of the wheel brake 40, detect a pressure of the wheel brake 40 through the pressure sensor, and generate the hydraulic pressure by moving the slave piston 52A using a rotational force of the motor 51 so that the detected pressure of the wheel brake 40 reaches the set target pressure.

Figure 4:
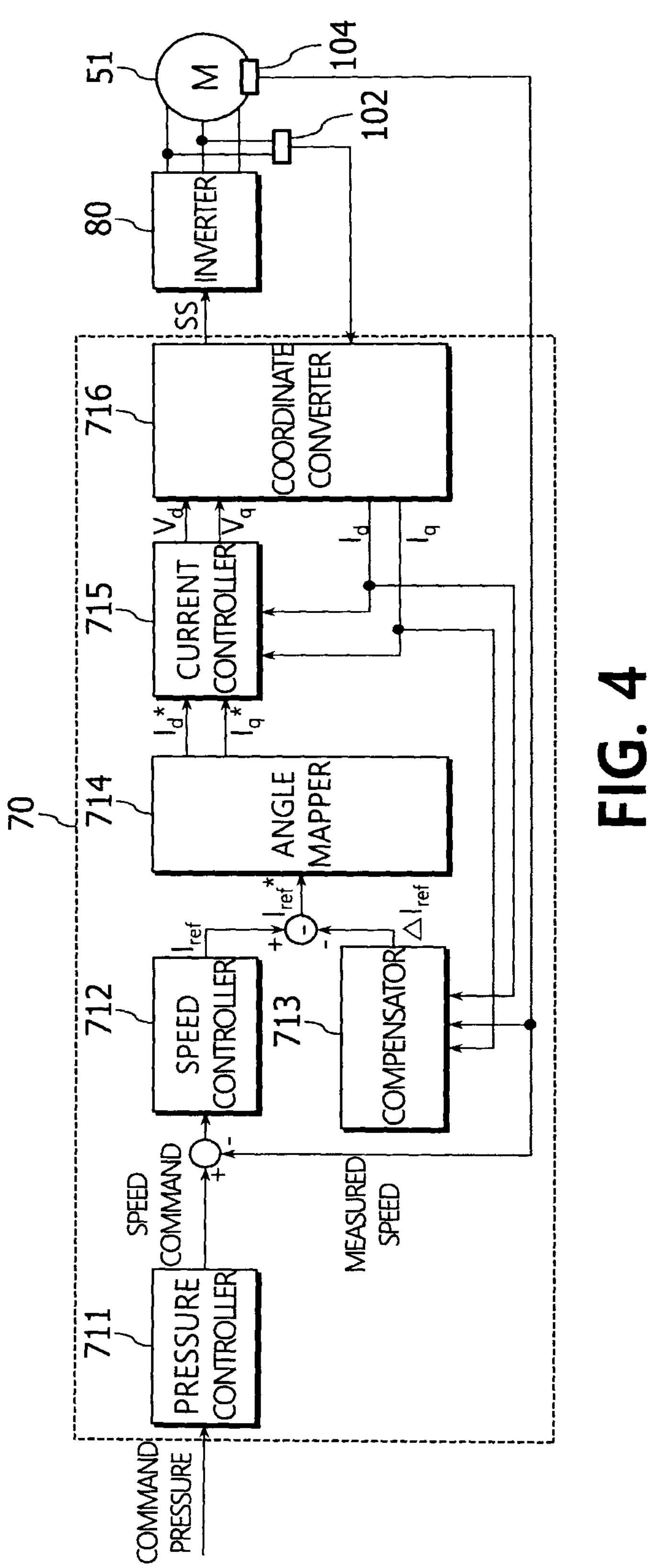
FIG. 4 shows a schematic control block configuration diagram of a controller 70 of the electro-mechanical brake system 1 according to an embodiment of the present disclosure.

FIG. 4 illustrates a schematic control block configuration diagram of a controller 70 of the electro-mechanical brake system 1 according to an embodiment of the present disclosure.

Referring to FIG. 4, the controller 70 may include a pressure controller 711, a speed controller 712, a compensator 713, an angle mapper 714, a current controller 715, and a coordinate converter 716. Of course, the pressure controller 711, the speed controller 712, the compensator 713, the angle mapper 714, the current controller 715, and the coordinate converter 716 may correspond to processes (or steps) in which each is sequentially processed in the processor 71. In this case, the pressure controller 711 may be differently referred to as a "control step", the speed controller 712 may be referred to as a "speed control step", the compensator 713 may be referred to as a "compensation step", the angle mapper 714 may be referred to as an "angle mapping step", the current controller 715 may be referred to as a "current control step", and the coordinate converter 716 may be referred to as a "coordinate conversion step".

For example, the pressure controller 711, the speed controller 712, the compensator 713, the angle mapper 714, the current controller 715, and the coordinate converter 716 may be hardware configurations of the processor 71 or software configurations performed by the processor 71. In particular, with relation to the software configuration, the pressure controller 711, the speed controller 712, the compensator 713, the angle mapper 714, the current controller 715, and the coordinate converter 716 may refer to each process loaded into the memory 72 and sequentially processed by the processor 71. In this case, each process may be processed by one process or each process may be processed by a plurality of processes.

The pressure controller 711 may output a speed command for adjusting the speed of the motor 51 so that the actual pressure of the wheel brake 40 reaches the command pressure. That is, the pressure controller 711 may output the speed command according to a pressure difference between the command pressure and the actual pressure, and the output speed command may be transmitted to the speed controller 712.

The speed controller 712 may output the current command $I_{ref}$ for adjusting the current of the motor 51 so that the actual speed of the motor 51 reaches the command speed. In addition, the compensator 713 may output a compensation current command $\Delta I_{ref}$ for adjusting the current command $I_{ref}$ in consideration of the current state of the battery B. In this case, the adjusted current command $I_{ref}{}^*$ which is the current command reflecting as much as the compensating current command $\Delta I_{ref}$ of the compensator 713 from the current command $I_{ref}$ of the speed controller 712 may be transmitted to the angle mapper 714. For example, the adjusted current command $I_{ref}{}^*$ may have a value obtained by subtracting, adding, or performing other operations from the value of $I_{ref}$ to the value of $\Delta I_{ref}$, but is not limited thereto.

However, for convenience of description, as shown in FIG. 4 and the like, the following description is provided to illustrate that the adjusted current command $I_{ref}{}^*$ has a value obtained by subtracting the value of $\Delta I_{ref}$ from the value of $I_{ref}$, but the present disclosure is not limited thereto.

The angle mapper 714 may perform dq conversion on the adjusted current command $I_{ref}{}^*$ through angle mapping. That is, the angle mapper 714 may convert the adjusted current command $I_{ref}{}^*$ into two mapping current commands $I_d{}^*$ and $I_q{}^*$ having values on the dq axis, which is a synchronous coordinate system, and output the converted two mapping current commands $I_d{}^*$ and $I_q{}^*$. At this time, the d-axis refers to a direct axis, and the q-axis refers to a quadrature axis. For example, the angle mapper 714 may perform beta angle mapping, but is not limited thereto. In this case, the mapping current commands $I_d{}^*$, $I_q{}^*$ output from the angle mapper 714 are transmitted to the current controller 715.

The current controller 715 may output voltage commands $V_d$ and $V_q$ for adjusting the operation of the motor 51 so that the actual current of the motor 51 reaches a current according to the mapping current commands $I_d{}^*$, $I_q{}^*$. That is, the current controller 715 may receive the d-axis current command $I_d{}^*$ and the q-axis current command $I_q{}^*$ which are the mapping current commands $I_d{}^*$, $I_q{}^*$ of the synchronous coordinate system from the speed controller 712, generate the voltage commands $V_d$ and $V_q$ of the synchronous coordinate system, and transmit the voltage commands $V_d$ and $V_q$ to the coordinate converter 716.

The coordinate converter 716 may convert the voltage commands $V_d$ and $V_q$ of the synchronous coordinate system into three-phase voltage commands (a-phase, b-phase, and c-phase), and generate a switching control signal SS accordingly, and provide the generated switching control signal SS to the inverter 80. Of course, an additional component connected to the coordinate converter 716 may be included in the controller 70 so as to generate and output the switching control signal SS according to the converted three-phase voltage commands (a-phase, b-phase, and c-phase).

The inverter 80 may control driving of the motor 51 by providing the three-phase current to the motor 51 according to the transmitted switching control signal SS. The operation of the inverter 80 may be controlled by the current controller 715. That is, the inverter 80 may provide the three-phase current to the motor 51 through the duty of pulse width modulation (PWM) of each of switching elements Q1 to Q6 based on the switching control signal SS according to the three-phase voltage commands (a-phase, b-phase, and c-phase). Of course, a single controller may be implemented by integrating functions of the current controller 715 and functions of the coordinate converter 716.

In this case, the motor 51 is provided with a motor position sensor 104, and the motor position sensor 104 may detect the position and speed of the rotor of the motor 51. The position and speed of the rotor detected by the motor position sensor 104 may be used to control feedback by the speed controller 712.

Referring to FIG. 3, a vehicle battery B serving as a DC power source, and a DC link capacitor C for smoothing a voltage signal may be electrically connected to the inverter 80. The DC link capacitor C may be connected in parallel to the battery B, and may smooth the DC voltage supplied from the battery B. As such, a DC voltage smoothed by the DC link capacitor C may be supplied to the inverter 80.

In the inverter 80, each of the switching elements Q1 to Q6 operates according to the switching control signal SS. The DC voltage output according to the operations of each of the switching elements Q1 to Q6 is converted into a three-phase AC voltage in the form of a pulse with an arbitrary variable frequency through PWM and supplied to the motor 51 to drive the motor 51. The inverter 80 may include a plurality of switching elements Q1 to Q6 and a plurality of diodes D1 to D6. For example, the inverter 80 may include six power switching elements Q1 to Q6 and six diodes D1 to D6, but the present disclosure is not limited thereto.

The inverter 80 can turn on or turn off each switching element Q1-Q6 by the switch control signal SS according to the three-phase voltage commands (a-phase, b-phase, and c-phase) provided from the current controller 715 to convert a DC supplied from the battery B into an AC current and supply the AC to the motor 51. In this case, the voltage of the battery B may be boosted by a converter (not shown) and supplied to the inverter 80.

Each phase terminal of the motor 51 may be electrically connected to the inverter 80. In this case, the motor 51 may have three coils of an a-phase coil, a b-phase coil, and a c-phase coil. For example, the a-phase coil, the b-phase coil, and the c-phase coil may constitute a Y-connection, but are not limited thereto. In the motor 51, AC having a phase difference of 120 degrees may be applied in each coil, thus a rotating shaft of the motor 51 may be rotated.

The current controller 715 may determine the voltage commands $V_d$ and $V_q$ so that the measured values of a driving current supplied by the inverter 80 to the motor 51 follow the current commands. A current sensor 102 for detecting the driving current supplied from the inverter 80 to the motor 51 may be provided between the inverter 80 and the motor 51. That is, two or more of the three-phase driving currents are measured by the current sensor 102 and converted into currents $I_d$, $I_q$ on a synchronous coordinate system (i.e., the dq axis) via a coordinate converter 716, and the converted currents $I_d$, $I_q$ may be fed back to the current controller 715. In this case, the current controller 715 may perform feedback control so that the values of the measured and converted currents $I_d$ and $I_q$ follow the current commands $I_d$* and $I_q$* received from the speed controller 712.

Figure 5:
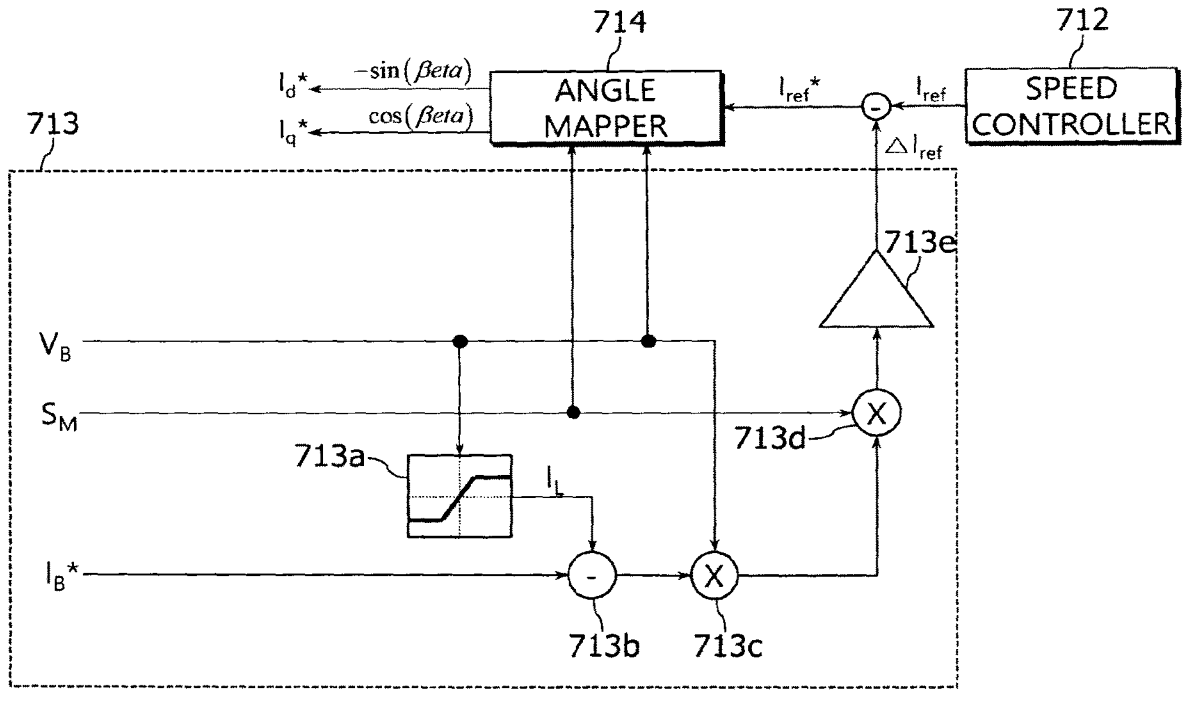
FIG. 5 shows a diagram related to a more detailed control block configuration of the compensator 713.
Figure 6:
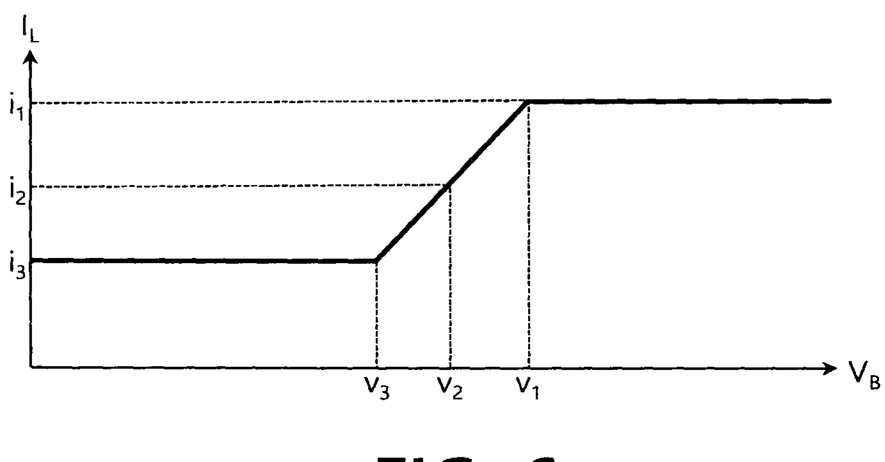
FIGS. 6 to 8 show various examples of mapping graphs used in a limiting current mapper 713A in FIG. 5.
Figure 7:
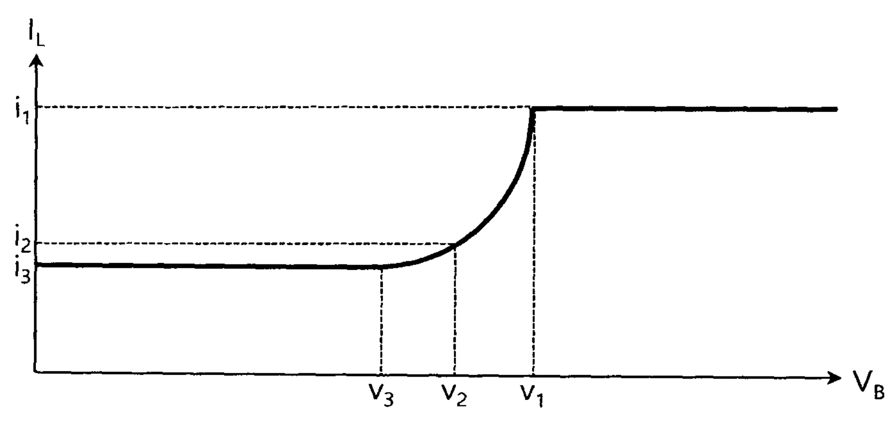
Figure 8:
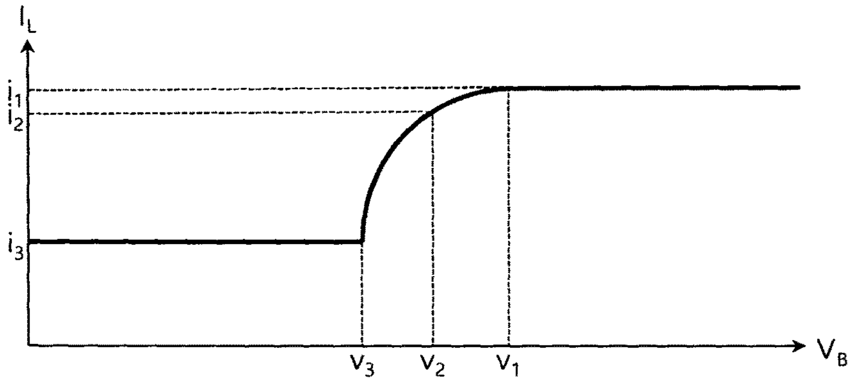

FIG. 5 shows a diagram related to a more detailed control block configuration of the compensator 713, and FIGS. 6 to 8 show various examples of mapping graphs used in a limiting current mapper 713A in FIG. 5.

Meanwhile, the compensator 713 may output a compensating current command $\Delta I_{ref}$ for adjusting the output of the motor 51. Referring to FIG. 5, the compensator 713 may include the limited current mapper 713A, a subtractor 713B, a multipliers 713C, 713D, and 713E. The limited current mapper 713A, the subtractor 713B, and the multipliers 713C, 713D, and 713E may be hardware components of the processor 71, or may be software components (e.g., processes or the like) executed by the processor 71.

First, $V_B$, $S_M$, and $I_B$* are applied to the compensator 713 as inputs. At this time, $V_B$ corresponds to voltage information of the battery B detected through the voltage sensor 103, $S_M$ corresponds to speed information of the motor 51 detected through the motor position sensor 104, and $I_B$* corresponds to estimated current of the battery B. That is, $I_B$* corresponds to an approximate estimation value of a sum of currents flowing between the battery B and each corresponding component according to power consumption of the components connected to the battery B.

Figure 9:
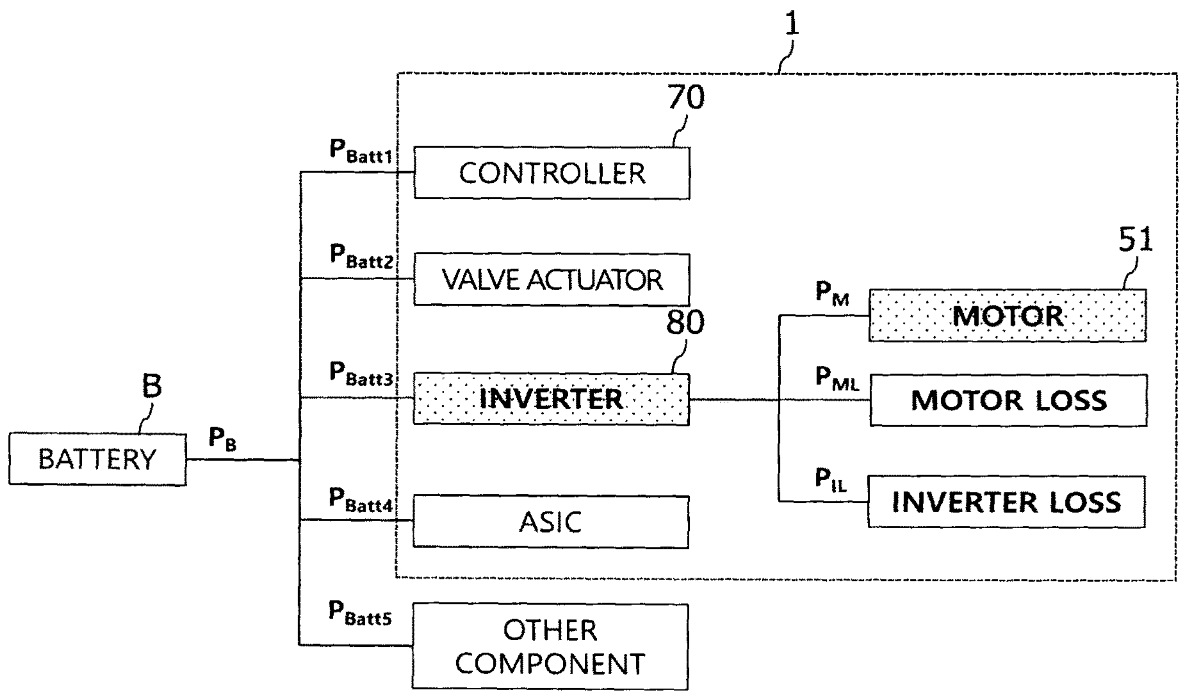
FIG. 9 shows various parts in which power of the battery B is consumed in the electro-mechanical brake system 1 according to an embodiment of the present disclosure.

FIG. 9 shows various parts in which power of the battery B is consumed in the electro-mechanical brake system 1 according to an embodiment of the present disclosure.

Referring to FIG. 9, $P_B$ is the power of the battery B and corresponds to the total power consumed by the components connected to the battery B. In other words, the $P_B$ may be expressed as the sum of the power ($P_{Batt1}$ to $P_{Batt5}$) consumed by various components connected to the battery B in this system 1 and the power ($P_{Batt6}$) consumed by other systems connected to the battery B.

Accordingly, $P_B=P_{Batt1}+P_{Batt2}+P_{Batt3}+P_{Batt4}+P_{Batt5}$. In this case, the $P_{Batt1}$ corresponds to a power consumed by the controller 70 of the system 1, the $P_{Batt2}$ corresponds to a power consumed by each valve actuator of the system 1, and the $P_{Batt3}$ corresponds to a power consumed by the inverter 80 of the system 1. In addition, $P_{Batt4}$ corresponds to a power consumed by the ASIC of the system 1.

On the other hand, the $I_B$ is the current of the battery B and corresponds to the sum of the currents flowing between the battery B and each corresponding component according to power consumption of the components connected to the battery B. In this case, $I_{IN}$ corresponds to a current applied to the inverter 80 of the system 1 to operate the inverter 80.

However, in the $P_B$ and $I_B$, most of them are occupied by $P_{Batt3}$ and $I_{IN}$ related to the inverter 80, and the rest are partially occupied. For example, $P_{Batt3}$ and $I_{IN}$ may occupy an amount corresponding to 90% to 99% of the $P_B$ and $I_B$, but the present disclosure is not limited thereto. In addition, in $P_{Batt3}$, a part is consumed as power $P_{ML}$ corresponding to motor loss generated in the motor 51, the other part is consumed as power $P_{IL}$ according to inverter loss generated in the inverter 80, most of it is applied to the motor 51 and consumed as power $P_M$ for operating the motor 51.

Accordingly, instead of computing the $P_B$, which is the total power consumed through the battery B, the $I_B$*, which is an estimate for the $I_B$, may be computed using the value of $P_{Batt3}$ (i.e., the power consumed by the inverter 80) occupying most of the $P_B$. Accordingly, the present disclosure may use the estimated current $I_B$* by replacing the $I_B$.

Accordingly, the total power $P_B$ consumed through the battery B may be expressed by Equation 1 below.

$$P_B = V_B I_B \fallingdotseq V_B I_B^* \tag{1}$$

In this case, the $V_B$ is a voltage of the battery B, and corresponds to a voltage currently maintained in the battery B according to the power consumption of components connected to the battery B, and may be detected through the voltage sensor 103.

In addition, the current $I_{IN}$ applied to the inverter 80 may be expressed by Equation 2 below.

$$I_{IN} = \sqrt{I_d^2 + I_q^2} \tag{2}$$

In this case, the $I_d$ and $I_q$ are currents in the synchronous coordinate system, respectively, and two or more currents among the three-phase driving currents detected by the current sensor 102 are converted into currents in the synchronous coordinate system through the coordinate converter 716, and may be computed in the coordinate converter 716. That is, the $I_d$ and $I_q$ are values computed by the processor 71 of the controller 70 based on the current information detected by the current sensor 102.

The power $P_{IN}$ consumed by the inverter 80 can be expressed by Equation 3 below using Equation 2 above. The $P_{IN}$ accounts for most of the power consumption for battery B.

$$P_{IN} = \frac{3}{2}(V_d I_d + V_q I_q) \tag{3}$$

In this case, the $V_d$ and $V_q$ are voltages in the synchronous coordinate system, respectively, and correspond to voltage commands calculated by the current controller 715. That is, the $V_d$ and $V_q$ are values computed by the processor 71 of the controller 70 to control the operation of the motor 51.

However, since the $P_{IN}$ occupies most of the total power $P_B$ of the battery B, it is assumed that the $P_{IN}$ corresponds to the $P_B$, and if Equation 1 above is applied to the $P_B$ and Equation 3 above is applied to the $P_{IN}$, it may be expressed as Equation 4 below.

$$P_B \fallingdotseq P_{IN} \tag{4}$$

$$V_B I_B^* \fallingdotseq \frac{3}{2}(V_d I_d + V_q I_q)$$

By rearranging Equation 4 above with respect to $I_B$*, it can be expressed as Equation 5 below (however, ≈, which is an approximate value equal sign, is expressed as =, which is a general equal sign).

$$I_B^* = \frac{3}{2}(V_d I_d + V_q I_q)/V_B \tag{5}$$

In this case, the $V_d$, $V_q$, $I_d$, and $I_q$ may be computed in the processor 71 of the controller 70 as described above, and $V_B$ may be detected through the voltage sensor 103. Accordingly, the $I_B$* may be obtained.

Meanwhile, the $P_M$ occupying most of the $P_{IN}$ may be expressed by Equation 6 below.

$$P_M = S_M T_M = S_M I_M K_t \tag{6}$$

In this case, the $S_M$ is a rotational speed of the motor 51, and may be detected through the motor position sensor 104. In addition, the $T_M$ is a torque of the motor 51, and may be expressed as a product of the current $I_M$ applied to the motor 51 and the $K_t$, which is a motor torque constant. However, the value of $K_t$ may be pre-stored in the memory 72.

In addition, if Equation 6 above is rearranged for $I_M$, it may be expressed as Equation 7 below.

$$I_M = P_M/(S_M K_t) \tag{7}$$

Hereinafter, the operation of the compensator 713 according to FIG. 5 will be described in more detail based on the above-described equations.

First, a difference (i.e., ΔI) between the $I_B$* value and $I_L$ value is computed through the operation of the subtractor 713B.

In this case, the $I_B$* may be a value computed according to Equation 6 or a value obtained by adding an additional current value from the value computed according to Equation 6. In addition, the $I_L$ corresponds to information on a maximum allowable current of the battery B limited according to the $V_B$ corresponding to a current voltage state of the battery B. In other words, the $I_L$ is information on a maximum current value of the battery B allowed to safely use the battery B in consideration of a current performance state of the battery B according to the $V_B$ detected by the voltage sensor 103.

For example, the total maximum current of the battery B having a maximum voltage state of 14 V may be 20 A. At this time, as the function of the battery B deteriorates, the current voltage state of the battery B detected by the voltage sensor 103 may be 9 V. In this case, it is preferable that a current reduced than the total maximum current of 20 A is used in the system 1 to protect the battery B. Accordingly, in the present disclosure, the power protection of the battery B may be performed by setting the $I_L$ to control the amount of current used in the motor 51 to be reduced in consideration of the $I_L$. That is, when the voltage $V_B$ of the battery B detected by the voltage sensor 103 is less than or equal to the maximum voltage state of the battery B (for example, when the $V_B$ is included in an adjustment required section to be described later), the amount of current used in the motor 51 may be controlled to be reduced in consideration of the $I_L$.

The $I_L$ value may be derived according to a mapping action of the limited current mapper 713A. That is, referring to FIGS. 6 to 8, mapping information of a value for the $V_B$ and a value for the $I_L$ may be pre-stored in the memory 72. Accordingly, the limited current mapper 713A may derive an $I_L$ value corresponding to a $V_B$ value of the battery B detected through the voltage sensor 103 using the corresponding mapping information.

The $I_L$ value derived in this way corresponds to a current value of the battery B that is allowed to the maximum in consideration of the current $V_B$ for power protection of the battery B. For example, referring to FIGS. 6 to 8, there may be a voltage section of the $V_B$ corresponding to $v_1>v_2>v_3$. In this case, for a section (hereinafter, referred to as "first section") for the $V_B$ equal to or greater than $v_1$, an $I_L$ value of $i_1$ corresponding to a maximum current value may be derived, and for a section (hereinafter, referred to as "third section") for the $V_B$ equal to or less than $v_3$, an $I_L$ value of $i_3$ corresponding to a minimum current value may be derived. That is, the first section may be a section including a portion in which the $V_B$ is in a maximum voltage state, and the third section may be a section including a portion in which the $V_B$ is in a voltage state lower than or equal to a predetermined level than the first and second sections.

In addition, for a section (hereinafter, referred to as "second section") for the $V_B$ from $v_3$ to $v_1$, as shown in FIG. 6, an $I_L$ having a linearly increasing value from $i_3$ to $i_1$ may be derived. In this case, when $v_2$ is $(v_1+v_3)/2$, which is an intermediate value of $v_1$ and $v_3$, $i_2$ corresponding to $(i_1+i_3)/2$, which is an intermediate value of $i_1$ and $i_3$ may be derived as an $I_L$ value.

However, the present disclosure is not limited to mapping the second section in a linear relationship as in the case of FIG. 6. That is, as shown in FIGS. 7 and 8, various correlation s may be mapped between the $V_B$ and $I_L$ in the second section. In this case, the term "correlation" refers to a relationship in which the $I_L$ value increases as the $V_B$ value increases and the $I_L$ value decreases as the $V_B$ value decreases.

Meanwhile, ΔI, which is a difference value between the $I_B$* and $I_L$, indicates how much more total current $I_B$* estimated to be currently used for the battery B is used than the limit current $I_L$. For example, when the ΔI is 3 A, it indicates that a total current $I_B$* estimated to be currently used for the battery B is more used than the limit current $I_L$ by 3 A. Accordingly, through the subsequent operation of the compensator 713, power protection for the battery B is possible by reducing a corresponding amount of 3 A in the amount of current used for the motor 51.

Next, through the operation of the multiplier 713C, ΔI value is multiplied by $V_B$ value of the battery B detected through the voltage sensor 103 ($\Delta P=\Delta I \cdot V_B$). That is, the corresponding multiplication is computed based on Equation 1, and the result may be expressed as ΔP.

In this case, ΔP is surplus power and indicates a current value for a current more used than the limit current IL for the battery B. That is, the ΔP is a power value according to a current currently used more than the $I_L$, which is the maximum current of the battery B allowed to more safely use the battery B in consideration of the $V_B$ state of the battery B.

Next, assuming that ΔP, which is the surplus power, is the power consumed when the motor 51 is driven, the compensation current command $\Delta I_{ref}$ of the motor 51 derived according to the assumption is computed. This is because most of the ΔP corresponds to $P_{Batt3}$ consumed by the inverter 80, and most of the $P_{Batt3}$ corresponds to the $P_M$, which is the power consumed according to the operation of the motor 51.

Specifically, the $\Delta I_{ref}$ may be computed based on Equation 8 above, which may be expressed by Equation 9 below.

$$\Delta I_{ref} = \Delta P/(S_M K_t) \tag{9}$$

In this case, the $S_M$ is a rotation speed of the motor 51, and may be detected through the motor position sensor 104. In addition, the ΔP is a value calculated in the previous step as surplus power, and $K_t$ is a motor torque constant pre-stored in the memory 72.

In order to compute the $\Delta I_{ref}$ according to Equation 9, the ΔP is multiplied by $1/S_M$ and $1/K_t$ in sequence through operations of the multipliers 713D and 713E. Thereafter, in order to remove noise or the like for the result of the corresponding multiplication, filtering of a low pass filter LPF, 713F may be performed on the result.

The $\Delta I_{ref}$ derived through this process may correspond to an amount of current unnecessarily used among the current $I_M$ of a motor 51 currently used for operation of the motor 51 in consideration of a current state of the battery B. That is, $\Delta I_{ref}$ may correspond to an amount of current exceeding a maximum current value of the motor 51 allowed to safely use the battery B in consideration of a current performance state of the battery B according to the $V_B$ detected by the voltage sensor 103 among the current $I_M$ of the motor 51.

The compensator 713 operating as described above may transmit the adjustment current command $I_{ref}$* reflecting as much as the compensation current command $\Delta I_{ref}$ to the angle mapper 714 in response to the current command $I_{ref}$ of the speed controller 712. As a result, the motor 51 may be driven according to the adjusted amount of current in consideration of the current performance state of the battery B according to the adjusted current command $I_{ref}$*.

Hereinafter, a control method according to an embodiment of the present disclosure will be described.

Figure 10:
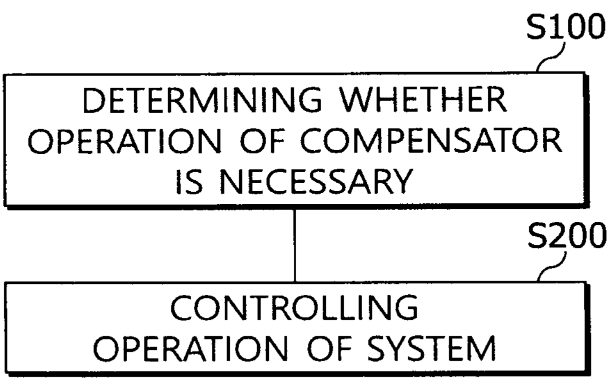
FIG. 10 shows a flowchart of a control method according to an embodiment of the present disclosure.

FIG. 10 illustrates a flowchart of a control method according to an embodiment of the present disclosure.

The control method (hereinafter referred to as the "control method") according to an embodiment of the present disclosure is performed by the controller 70 and is a method for performing control on the motor 51 for protecting the power of the battery B in the system 1.

To this end, the control method may include S100 and S200 as shown in FIG. 10. The execution of these S100 and S200 may be controlled by the processor 71 of the controller 70.

First, the controller 70 may determine whether an operation of the compensator 713 is necessary (Step 100). That is, the controller 70 may determine whether the $V_B$, which is voltage information of the battery B detected by the voltage sensor 103, corresponds to a preset adjustment required section or an adjustment unnecessary section. At this time, the adjustment required section corresponds to a section of the $V_B$ in which the operation of the compensator 713 is necessary, and the adjustment unnecessary section corresponds to a section of the $V_B$ in which the operation of the compensator 713 is unnecessary.

For example, the second and third sections described above correspond to the adjustment required section and the first section described above correspond to the adjustment unnecessary section.

Information on the adjustment required section is prestored in the memory 72. In this case, at least one section among the ranges where the $V_B$ may have may be set as the adjustment required section. In the case of the adjustment required section, the $V_B$ and the $I_L$ may be mapped in a linear relationship or a correlation.

next, the controller 70 performs an operation of the system 1 (Step 200). In this case, when the operation of the compensator 713 is necessary in S100, the controller 70 may control the operation of the system 1 by reflecting the result according to the operation of the compensator 713.

In other words, the controller 70 may control the system 1 to operate based on the adjusted current command $I_{ref}$* reflecting as much as the compensation current command $\Delta I_{ref}$ of the compensator 713 with respect to the current command $I_{ref}$. Accordingly, the controller 70 may control the motor 51 to be driven depending on the amount of current adjusted in consideration of the current performance state of the battery B according to the adjusted current command $I_{ref}$*.

However, since the operation of the compensator 713 is the same as described above in FIGS. 5 to 9, a description of the operation thereof will be omitted below.

On the other hand, the controller 70 and/or component thereof may include one or more processors 71 coupled to a computer-readable recording medium storing computer-readable code/algorithm/software. The processor 71 may execute the computer-readable code/algorithm/software stored in the computer-readable recording medium to perform the above-described functions, operations, and steps.

The controller 70 and/or the component thereof may further include a memory 72 implemented as a computer-readable non-transitory recording medium or a computer-readable temporary recording medium. The memory 72 may be controlled by the controller 70 and/or the component thereof, and may be configured to store data transmitted to or received from the controller 70 and/or the component thereof, or may be configured to store data to be processed or processed by the controller 70 and/or the component thereof.

The above-described control method may be implemented as a computer-readable code/algorithm/software on a computer-readable recording medium. The computer-readable recording medium may be a computer-readable non-transitory recording medium such as a data storage device capable of storing data readable by a processor/microprocessor. Examples of the computer-readable recording medium include a hard disk drive (HDD), a solid state drive (SSD), a silicon disk drive (SDD), a read-only memory (ROM), a CD-ROM, a magnetic tape, a floppy disk, an optical data storage device, and the like.

The system 1 configured as described above has the advantage of protecting the power of the battery B and limiting the current of the battery B within a stable range when the motor 51 is controlled. In addition, the system 1 has an advantage of preventing the voltage $V_B$ of the battery B from falling below a predetermined level by limiting the current of the battery B usable for each band with respect to the voltage $V_B$ of the battery B according to the $I_L$ when the motor 51 is controlled. In addition, the system 1 may maintain the power of the battery B at a predetermined level even in a situation where the voltage $V_B$ of the battery B is unstable when the motor 51 is controlled, and thus may prevent another battery system in a vehicle using the battery B from being down during a vehicle operation due to a rapidly degraded battery voltage $V_B$, thereby enabling a function stabilization of the other battery system. In addition, the system 1 has the advantage of limiting the battery current in accordance with the $I_L$ under limited battery conditions while being able to control a braking force of a certain level or more to be provided to the vehicle. In addition, the system 1 has the advantage of being able to prevent overheating of the battery B while improving the efficiency of the system due to the additional battery current ripple reduction effect.

Although the present disclosure has been described in detail with reference to specific embodiments, it is to be understood that various modifications are possible without departing from the scope of the present disclosure. Therefore, the scope of the present disclosure is not limited to the described embodiments, but should be defined by the following claims and equivalents thereto.

10 brake pedal
20 master cylinder
30 hydraulic pressure block
40 wheel brake
50 hydraulic pressure supply device
60 hydraulic pressure control unit
70 controller
71 processor
72 memory
80 inverter
90 valve driver
100 sensor
101 pedal displacement sensor
102 current sensor
103 voltage sensor
104 motor position sensor

What is claimed is:

1. An apparatus for controlling an electro-mechanical brake system of a vehicle, the apparatus comprising:
   - a memory; and
   - a processor configured to control an operation of the system by controlling a motor operating based on power of a battery to provide a braking force to the vehicle using information stored in the memory,
   - wherein the processor is configured to
     - determine a maximum allowable current $I_L$ based on a battery voltage $V_B$,
     - determine a battery current $I_B$*,
     - determine a compensation current command $\Delta I_{ref}$ based on difference between the maximum allowable current $I_L$ and the battery current $I_B$*, and
     - control a current applied to the motor based on an adjusted current command $I_{ref}$*-which is obtained by adjusting $I_{ref}$ by $\Delta I_{ref}$,
   - wherein the compensation current command $\Delta I_{ref}$ is determined by:
     - determining a current difference $\Delta I$ between the maximum allowable current $I_L$ and the battery current $I_B$*,
     - determining a residual power $\Delta P$ by multiplying the current difference $\Delta I$ by battery voltage $V_B$, and
     - dividing the residual power $\Delta P$ by a result of multiplication of a rotational speed $S_M$ of the motor and a motor torque constant $K_L$.

2. The apparatus of claim 1, wherein the processor is configured to control the current applied to the motor to be reduced if the $V_B$ is comprised in an adjustment required section.

3. The apparatus of claim 2, wherein the adjustment required section comprises a section in which the $V_B$ corresponds to a value smaller than a value of a maximum voltage state of the battery.

4. The apparatus of claim 2, wherein the adjustment required section comprises a specific section in which the $I_L$ and the $V_B$ are mapped in a linear relationship or a correlation.

5. The apparatus of claim 4, wherein the specific section is comprised between a point at which the $I_L$ has a maximum current value and a point at which the $I_L$ has a minimum current value.

6. The apparatus of claim 1, wherein the processor is configured to estimate an estimated value, $I_B$* for a total current of the battery using a power value consumed by an inverter driving the motor using power of the battery, and derive the $\Delta I_{ref}$ based on the estimated value, $I_B$*.

7. The apparatus of claim 1, wherein the processor is configured to convert the $I_{ref}$* into current commands, $I_d$* and $I_q$* in a coaxial coordinate system, derive voltage commands, $V_d$ and $V_q$ for adjusting the operation of the motor depending on the converted $I_d$* and $I_q$*, and convert the derived $V_d$ and $V_q$ into a three-phase voltage command of the motor.

8. A electro-mechanical brake system of a vehicle, the system comprising:
   - a master cylinder being connected to a brake pedal;
   - a hydraulic pressure supply device comprising a motor generating a rotational force and a hydraulic pressure piston movably accommodated in a pressure chamber, and generating hydraulic pressure by movement of the hydraulic pressure piston;

a hydraulic pressure control unit controlling a flow of the hydraulic pressure transmitted from the hydraulic pressure supply device to a wheel cylinder;

a hydraulic pressure block having the master cylinder, the hydraulic pressure supply device, and the hydraulic pressure control unit integrated therein; and a controller for controlling the motor and the hydraulic pressure control unit, and controlling the motor operating based on power of a battery to provide a braking force to the vehicle, wherein the controller is configured to determine a maximum allowable current $I_L$ based on a battery voltage $V_B$, determine a battery current $I_B$*, determine a compensation current command $\Delta I_{ref}$ based on difference between the maximum allowable current $I_L$ and the battery current $I_B$*, control a current applied to the motor based on an adjusted current command $I_{ref}$* which is obtained by adjusting $I_{ref}$ by $\Delta I_{ref}$, wherein the compensation current command $\Delta I_{ref}$ is determined by:

determining a current difference ΔI between the maximum allowable current $I_L$ and the battery current $I_B$*, determining a residual power ΔP by multiplying the current difference ΔI by battery voltage $V_B$, and dividing the residual power ΔP by a result of multiplication of a rotational speed $S_M$ of the motor and a motor torque constant $K_L$.

9. A control method performed in an electro-mechanical brake system of a vehicle and controlling a motor operating based on power of battery to provide a braking force to the vehicle, the method comprising:

determining whether $V_B$, which is voltage information of the battery, corresponds to an adjustment required section;

determining a maximum allowable current $I_L$ based on a battery voltage $V_B$;

determining a battery current $I_B$*;

determining a compensation current command $\Delta I_{ref}$ based on difference between the maximum allowable current $I_L$ and the battery current $I_B$*; and controlling a current applied to the motor based on an adjusted current command $I_{ref}$*-which is obtained by adjusting $I_{ref}$ by $\Delta I_{ref}$, wherein the compensation current command $\Delta I_{ref}$ is determined by:

determining a current difference ΔI between the maximum allowable current $I_L$ and the battery current $I_B$*;

determining a residual power ΔP by multiplying the current difference ΔI by battery voltage $V_B$; and dividing the residual power ΔP by a result of multiplication of a rotational speed $S_M$ of the motor and a motor torque constant $K_L$.

10. The method of claim 9, wherein the controlling comprises:

controlling the current applied to the motor to be reduced if the $V_B$ corresponds to the adjustment required section.

11. The method of claim 10, wherein the adjustment required section comprises a section in which the $V_B$ corresponds to a value smaller than a value of a maximum voltage state of the battery, and the adjustment required section comprises a specific section in which the $I_L$ and the $V_B$ are mapped in a linear relationship or a correlation.

12. The method of claim 11, wherein the specific section is comprised between a point at which the $I_L$ has a maximum current value and a point at which the $I_L$ has a minimum current value.

13. The method of claim 9, wherein the controlling comprises:

estimating an estimated value, $I_B$* for a total current of the battery using a power value consumed by an inverter driving the motor using power of the battery, and derive the $\Delta I_{ref}$ based on the estimated value, $I_B$*.

14. The method of claim 9, wherein the controlling comprises:

converting the $I_{ref}$* into current commands, $I_d$* and $I_q$* in a coaxial coordinate system;

deriving voltage commands, $V_d$ and $V_q$ for adjusting the operation of the motor depending on the converted $I_d$* and $I_q$*; and converting the derived $V_d$ and $V_q$ into a three-phase voltage command of the motor.

* * * * *